C. CLARK.
LUBRICATING DEVICE.
APPLICATION FILED NOV. 26, 1918.
1,303,772.
Patented May 13, 1919.
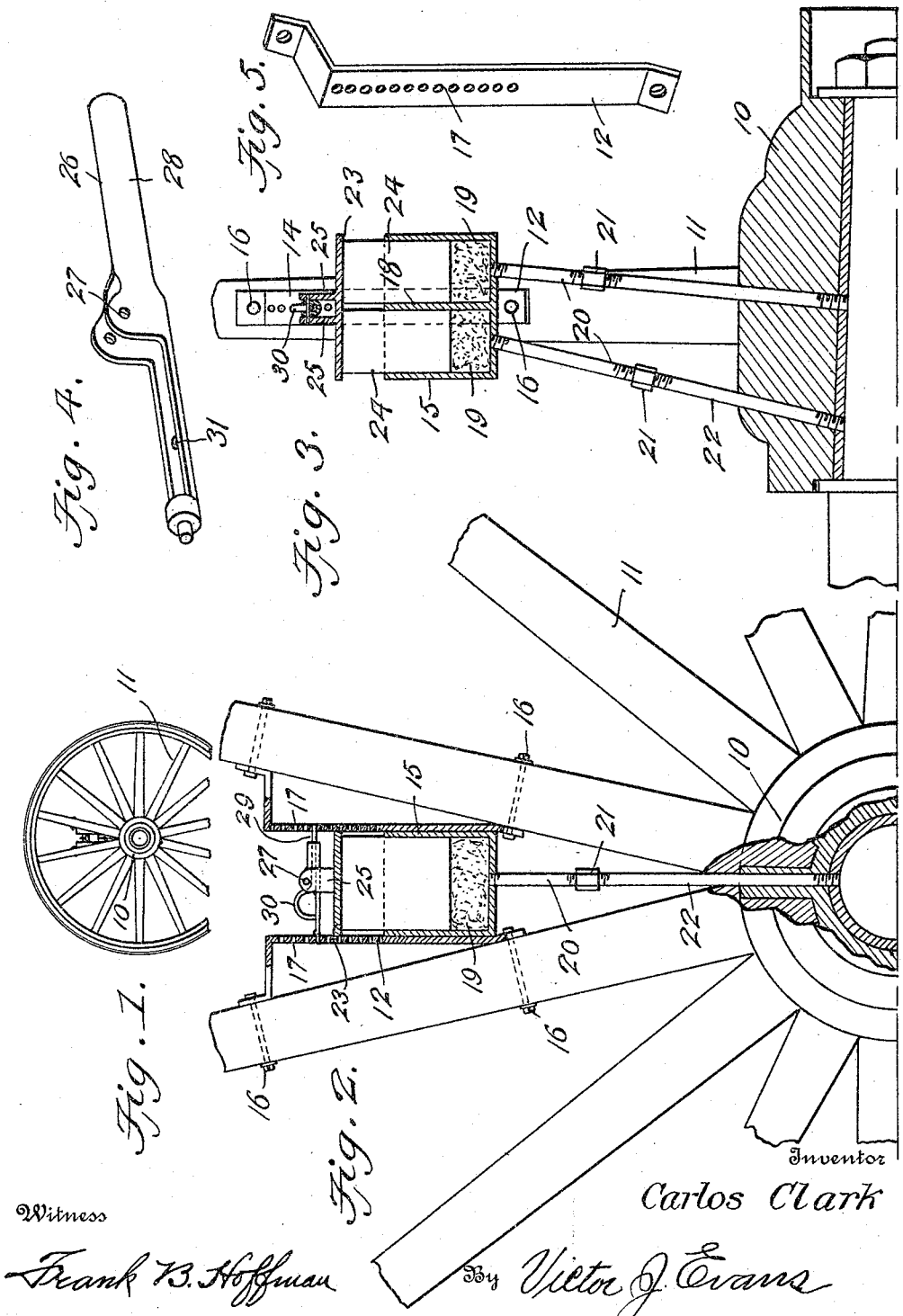
Inventor
Carlos Clark

UNITED STATES PATENT OFFICE.

CARLOS CLARK, OF OURAY, UTAH.

LUBRICATING DEVICE.

1,303,772. Specification of Letters Patent. Patented May 13, 1919.

Application filed November 26, 1918. Serial No. 264,182.

*To all whom it may concern:*

Be it known that I, CARLOS CLARK, a citizen of the United States, residing at Ouray, in the county of Uinta and State of Utah, have invented new and useful Improvements in Lubricating Devices, of which the following is a specification.

This invention relates to improvements in lubricating devices, the object being to provide means for lubricating the spindles of vehicle axles, without removing the wheels.

Another object of the invention is the provision of a device of the above character, which will continuously feed a lubricant to a spindle, so as to prevent the latter from becoming dry, novel means being provided for quickly and easily adjusting the device to provide for such continuous feeding.

A further object is the provision of novel means for securing the device between the spokes of a wheel, the means by which adjustment of the feeding means is effected also serving to hold the lubricant receptacle.

Other objects and advantages of the invention will appear as the following description is read in connection with the accompanying drawings.

In the drawings:—

Figure 1 is a side elevation of a portion of a vehicle wheel with the invention applied thereto;

Fig. 2 is an enlarged vertical sectional view taken on a line with the spokes of the wheel;

Fig. 3 is a transverse sectional view taken at right angles to Fig. 2;

Fig. 4 is a detail perspective view of the pivoted adjusting lever; and

Fig. 5 is a similar view of one of the adjusting brackets.

Referring to the drawings in detail, the hub of the wheel is indicated at 10 and the spokes at 11. Secured to the inner faces of the adjacent spokes are brackets 12, these brackets being provided with longitudinal portions 14 which are disposed in parallelism and have secured between them a box like receptacle 15. The brackets 12 have each of their ends secured to the spokes through the medium of suitable clamping devices 16 and are provided with spaced openings 17, for a purpose hereinafter apparent.

The receptacle 15 is open at the top and is formed with a partition 18, dividing the said receptacle into separate compartments 19. Communicating with each of the compartments 19 is a pipe 20, which is joined by means of a pipe coupling 21, to a short pipe section 22, which extends through the hub 10 and threadedly engages an opening in the boxing of the spindle of the axle. These pipes serve to convey the lubricant from the receptacle 15 to the interior of the hub and are so arranged that one pipe enters the hub at approximately its longitudinal center, while the other pipe enters the hub at a point adjacent the rear end thereof, that is, the end of the hub adjacent the vehicle. This serves to evenly distribute the lubricant over the axle so that the low portion of the latter will become dry.

The receptacle 15 is provided with a cover 23, which carries upon its under side follower blocks 24, these blocks being so spaced as to be positioned upon each side of the partition 18 for entrance into each of the compartments 19. The blocks 24 serve to force the lubricant through the pipes and upon the spindle of the axle. The cover 23 is provided upon its upper face with spaced ears 25, between which is pivotally mounted a lever 26, one end of which is adapted for engagement with the spaced opening 17 in one of the brackets 12. This lever is pivoted intermediate its ends upon a pivot pin 27 and the opposite end of the lever is provided with a sleeve 28, in which is slidably mounted a bolt 29. The outer end of this bolt is adapted for engagement with the spaced opening 17 in the opposite bracket 12 and the inner end of the said bolt is provided with a hook 30, adapted for yielding engagement with an opening 31 in the lever 26 for the purpose of holding the bolt within the openings.

By withdrawing the bolt 29 from its engagement with the openings 17, the lever 26 may be swung upon its pivot and disengaged from its particular opening, so that the follower blocks 24 may be adjusted within the receptacle to cause the proper distribution of the lubricant.

The invention is susceptible of various changes in its form, proportions and minor details of construction and the right is reserved to make such changes as will properly fall within the scope of the appended claims.

Having described the invention, what is claimed is:—

1. A lubricating device comprising a receptacle provided with an open top and an outlet opening in the bottom, a cover for said receptacle, a follower carried by the under side of said cover and extending within the receptacle, uprights positioned upon each side of the receptacle and means carried by the cover and engageable with the uprights for adjusting the follower.

2. A lubricating device comprising a receptacle provided with an open top and an outlet opening in the bottom a cover for said receptacle, a follower carried by the under side of said cover and extending within the receptacle, uprights positioned upon each side of the receptacle and means pivotally secured to the cover and engageable with the uprights for adjusting the follower.

3. A lubricating device comprising a receptacle provided with an open top and an outlet opening in the bottom, a cover for said receptacle, a follower carried by the under side of said cover and extending within the receptacle, uprights positioned upon each side of the receptacle and pivotal and lateral adjustable means carried by the cover and engageable with the uprights for adjusting the follower.

4. A lubricating device comprising a receptacle provided with an open top and an outlet opening in the bottom, a cover for said receptacle, a follower carried by the under side of the cover and extending within the receptacle, uprights positioned upon each side of the receptacle, a lever pivotally mounted upon the cover and having one end adapted to be received in spaced openings provided in the uprights, a sleeve located on the opposite end of the lever and a bolt slidable in said sleeve for engagement in said spaced openings, whereby the follower may be adjusted within the receptacle.

5. A lubricating device comprising a receptacle having an open top, a partition therein dividing the receptacle into separate compartments, each of which is provided with an outlet pipe, a cover for the receptacle, follower blocks carried by said cover, said blocks being spaced apart for operation in each of the compartments and means for adjusting the cover to regulate the follower blocks.

6. The combination with a wheel, of parallel brackets secured to the opposed faces of adjacent spokes, a lubricating device including a receptacle secured between said brackets, a removable cover for said receptacle, a follower carried by the cover, means engageable with the brackets for adjusting the cover and means extending from the bottom of the receptacle and communicating with the interior of the hub of the wheel for lubricating the axle.

In testimony whereof I affix my signature.

CARLOS CLARK.

Copies of this patent may be obtained for five cents each, by addressing the "Commissioner of Patents, Washington, D. C."